Figure 1:
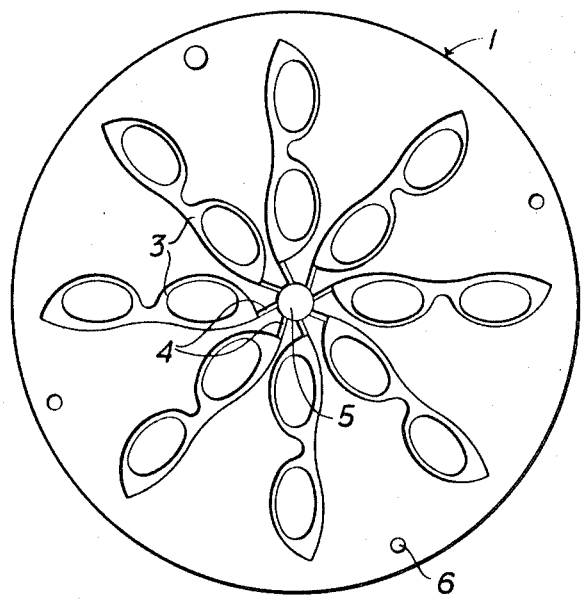

United States Patent

[11] 3,601,857

| [72] | Inventor | Gerald Hampel |
| | | Vienna, Austria |
| [21] | Appl. No. | 793,725 |
| [22] | Filed | Jan. 24, 1969 |
| [45] | Patented | Aug. 31, 1971 |
| [73] | Assignee | Optipatent AG |
| | | Zug, Switzerland |

[54] SPLIT MOULD FOR MANUFACTURING SYNTHETIC RESIN MOULDINGS
3 Claims, 2 Drawing Figs.

[52] U.S. Cl. ..................................................... 18/47 R,
249/134
[51] Int. Cl. ..................................................... B29c 1/02,
B28b 7/06, B28b 7/34
[50] Field of Search ............................................ 18/47 R, 47
C; 249/134

[56] References Cited
UNITED STATES PATENTS

| 3,061,500 | 10/1962 | Kreier .......................... | 431/64 |
| 3,101,065 | 8/1963 | Kalis ............................ | 72/465 |
| 3,317,178 | 5/1967 | Kreier, Jr. ..................... | 249/134 |
| 3,388,203 | 6/1968 | Meininger et al. ............. | 264/225 |
| 3,427,689 | 2/1969 | Windecker ................... | 18/47 |

Primary Examiner—J. Spencer Overholser
Assistant Examiner—R. L. Spicer, Jr.
Attorney—Dean Laurence ABSTRACT: A split mould made of epoxy resin and polyaminoamide. Cross-linking is controlled to provide rigidity at room temperature but low ball indentation hardness at operating mould temperatures to seal between abutting mould sections.

PATENTED AUG 31 1971

3,601,857

INVENTOR
GERALD HAMPEL
BY
Dean Laurence
ATTORNEY

SPLIT MOULD FOR MANUFACTURING SYNTHETIC RESIN MOULDINGS

For the production of duroplast cast resin mouldings, e.g. mouldings made of epoxy, polyurethane, or unsaturated polyester resins, it is known to employ moulds made of rubber-elastic, flexible compositions, such as silicone rubber. Such rubber-elastic silicone compositions have the advantage that removal from the mould is easy even in the production of undercut mouldings. However, owing to its rubberlike properties, the dimensional stability of this mould material is very low, so that they do not allow injection moulding. Furthermore, the assembly of the mould parts with the aid of prison bolts or rings is difficult and the production rate of such moulds is low. Moulds for producing cast resin articles or for injection moulding of epoxy, polyurethane or polyester articles in small series are also known. All these resins have a high resistance to temperature and pressure as well as a high hardness, and in most cases filler-containing material is used. Such moulds are dimensionally stable, but their sealing necessitates special measures, particularly when thinly flowing resins are cast. It is necessary to use either very precise and therefore expensive master models, involving an additional precise reworking, or special packings between the mould parts, e.g. rubber cords, O-rings or the like. These packings have the disadvantage that they adhere to the plastic material introduced into the mould and rapidly become unusable.

The object of the invention is to avoid these drawbacks and consists essentially therein, that the degree of cross-linking is so selected, that the material of the mould is rigid at room temperature, while at elevated temperatures, e.g. at the operating temperature, it has a low ball indentation hardness so as to be subject to plastic or elastic deformation on the surface.

The cross-linking of the material, expressed as the degree of cross-linking, $N$, is of decisive importance for the dimensional stability of the mould. $N$ is defined at the product of the epoxy value by the functionality (the number of epoxy groups per molecule), since the cross-linking density of the mould material increases with the number of epoxy groups available per weight or volume unit and per molecule of the starting resin. It must be emphasized however, that $N$ is merely proportional to and not identical with the real degree of cross-linking $N_r$, which can be calculated from the shear modulus according toe the kinetic theory of rubber elasticity. In a manner of speaking, the cross-linking creates a latticework, which confers a high dimensional stability to the material and, if the cross-linking does not exceed a certain degree, still allows a certain plastic or elastic deformation on the surface. Here, owing to the freedom of movement of the molecular chains an elastic state of high bending strength is achieved, but, owing to the cross-linking nodes, the mould remains dimensionally stable to a larger extent. This condition can be best achieved when the mean degree of cross-linking of the mould material is $N=0.8-1.0$. Similar considerations apply to the curing agents and generally to all reactive components added to the system. When two parts of the mould come to bear against each other along their uneven joint surfaces, the small elevations which interfere with accurate fit and thus with the sealing of the mould will be deformed even by slight pressure, so that a satisfactory fit and sealing will be achieved under the usual fitting pressure of the mould parts without any additional measures. However, the degree of cross-linking must be selected high enough to effect, that this superficial deformation takes place only at elevated temperatures, i.e. at the operating temperature, so that at room temperature the mould material can be machined without difficulty, which is of great importance with regard to the precision of the mould. In the production of cast resin mouldings this operating temperature is between 80° and 150° C., while it may reach 180° to 320° C. during injection moulding of thermoplastics. In order to satisfy the condition whereby the material is to remain workable by machining at room temperature while during operation the mould parts are sealed by elastic or plastic deformation, it suffices to assume as temperature limit for the working temperature about 100° C. At these temperatures the stability of the mould is to be preserved, while the ball indentation hardness of the surface is to be reduced sufficiently to achieve a sealing effect. The required degree of cross-linking in each individual case can be determined empirically. However, the stability of the mould or the dimensional stability, resulting from the structure formed by cross-linking can be further increased by mechanically reinforcing the mould walls, e.g. with glass fiber mats, glass fiber fabrics or rovings. Such a reinforcement increases the dimensional stability without affecting the elastic or plastic deformability of the surface of the material which is essential for the sealing effect.

According to the invention, the mould can also be provided with a surface layer consisting of a hard, wear-resistant and temperature-resistant material, which will be advantageous especially in cases where synthetic resin mixtures containing abrasive filler materials are to be processed. Such surface layers may consist for example of the CIBA epoxy primer resin system Araldit SW 405 with hardener SW 405, and provide a satisfactory effect when applied with a thickness of 0.1 mm. If the thickness of such surface layers does not exceed 0.3 mm., they will not affect the joint surfaces of the mould with regard to the sealing effect, since they are supported from below by the material which can undergo plastic or elastic deformation at the operating temperature, so that they will yield to the extent required for sealing.

It has been found that such moulds are capable of withstanding increased injection pressures during injection moulding, without any trouble or deformation, in spite of the fact that the material undergoes plastic or elastic deformation at the operating temperature. At the irregularities of the joint surfaces, the pressure acts partially at the elevated portions thus, pressure peaks are formed. In addition, these elevated portions can yield towards the depressions, without requiring a compressibility of the material itself. However, during injection the filling pressure acts uniformly at all points of the inner wall of the mould, so that the mould material cannot yield under the effect of the injection pressure. Since the mould material is not compressible, the injection pressure cannot cause any plastic or elastic deformation.

EXAMPLE:

To produce a mould for the manufacture of combs by casting or injection moulding, the master model split in two along the line of joint is attached by cementing or screwing to a steel plate each with recesses for prison bolts or prison rings and covered with a mixture consisting of 60 parts Reichhold epoxy resin Epotuf 37 140
40 parts Dow epoxy resin D E R 736
27 parts diphenylmethane-diamine, Hardener B 250 of the BASF, and cured thereafter for two hours at 110° C. After removal from the mould the pattern halves can be fitted together and used directly, without any reworking, for the production of combs.

The drawing illustrates the invention with reference to an example of embodiment.

Figure 2:
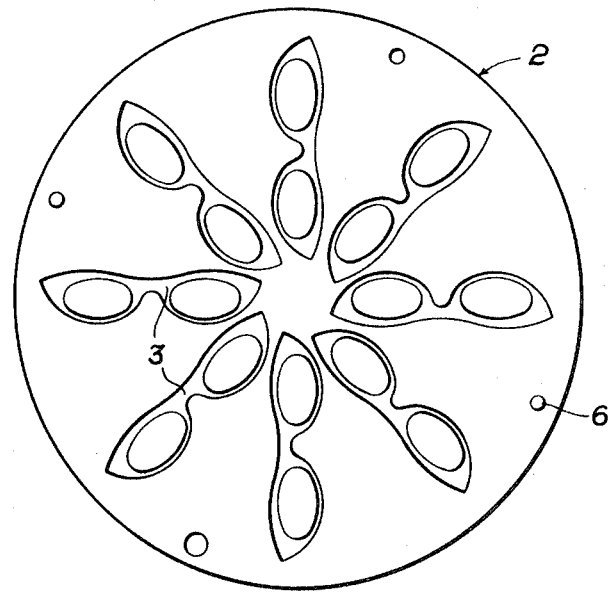

FIG. 1 shows the upper part and FIG. 2 the lower part of a mold.

the mould consists of an upper part 1 and a lower part 2. These plate-shaped parts have mould cavities 3 for spectacle frames, which communicate through channels 4 with the inlet 5, while reference 6 designates holes for adapter bolts.

The two mould parts 1, 2 were prepared follows:

100 parts by weight of a mixture of diepoxides on the base of Bisphenol A (a mixture of glycidyl-ethers of the general formula:

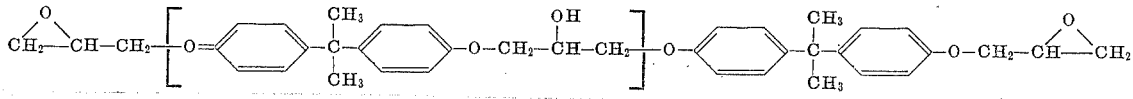

in which mixture the epoxides with $n=0$ amounted to 88 weight-percent, the epoxides with $n=1$ to 10 weight-percent and the epoxides with $n=2$ to 2 weight-percent, the epoxy-equivalent weight of this mixture is 190; Shell Epikote 820) and 60 parts weight of a polyaminoamide (Versamid 140) were mixed together. The resulting mixture, after degassing in the conventional manner, was cast bubble-free into moulds corresponding to the two mould parts and therein cured for one hour at 100°C.

AT the casting temperature, this material becomes plastic to such an extent that the two surfaces bear against each other with sealing effect. Consequently, a separate packing between the upper and lower part of the mould can be dispensed with, making possible thereby a precise casting of the spectacle frames. A mould of this kind is particularly suitable for vacuum casting.

I claim:

1. A split mould for the moulding of synthetic resin articles comprising a plurality of mould parts which bear against each other along abutting surfaces, said mould parts being formed of an epoxy resin which is a glycidyl ether of Bisphenol A that is cross-linked by a sufficient amount of polyaminoamide so that the mean degree of cross-linking, N, of the mould material is 0.8–1.0 whereby the mould material is rigid at room temperature, while at elevated temperatures of about 80° C. and above, the material has a low ball indentation hardness and undergoes elastic deformation along said abutting surfaces to provide a seal therebetween.

2. A mould according to claim 1 wherein said epoxy resin has an epoxy equivalent weight of about 190.

3. A mould according to claim 2 wherein said polyaminoamide cross-linking agent is provided in an amount equal to at least about 60 weight percent of said epoxy resin.